Patented Jan. 8, 1952

2,581,392

UNITED STATES PATENT OFFICE 2,581,392

QUATERNARY AMMONIUM DERIVATIVES OF CHLOROXY PROPYLATED OXYALKYLATED PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application May 6, 1949, Serial No. 91,887

10 Claims. (Cl. 260—52)

The present invention is concerned with certain new chemical products, compounds or compositions which have useful application in various arts. These compounds are quaternary ammonium compounds prepared in the manner hereinafter described.

Our invention includes methods or procedures for manufacturing said new chemical products, compounds, or compositions, as well as the products, compounds, or compositions themselves. Said new compounds or compositions are quaternary ammonium compounds derived by reaction between (1) a chloro-oxypropylated derivative of hydrophile hydroxylated synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

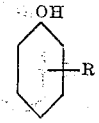

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals; and $n$ is a numeral varying from 1 to 20; with the proviso that at least 2 moles of alkylene oxide be introduced for each phenolic nucleus; said chloro-oxypropylated compounds being obtained by reaction with epichlorohydrin; and (2) a basic tertiary amine having not over 50 carbon atoms.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial No. 91,886, filed May 6, 1949, now Patent 2,542,011, granted February 20, 1951. See also our co-pending application Serial No. 64,469, filed December 10, 1948.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles such as sewage, coal washing waste water, and various trade wastes and the like; as germicides, insecticides, emulsifying agents, as, for example, for cosmetics, spray oils, water-repellent textile finishes; as lubricants, etc.

The instant ammonium compounds are of particular value for various purposes where quaternary ammonium compounds have found specific application.

The oxyalkylated resins, used as intermediates to produce the products of this application, are described in our Patents 2,499,370, granted March 7, 1950, and 2,542,011, granted February 20, 1951, and reference is made to these patents for a description of phenol-aldehyde resins used to produce the alcoholic products. For specific examples of these resins, reference is made to Examples 1a through 103a of Patent 2,499,370. For examples of oxyalkylated products derived from these resins, reference is made to the tables in columns 31 through 46 of Patent 2,542,011.

The reaction of epichlorohydrin is, in essence, a continuation of the reaction involving ethylene oxide, propylene oxide, or the like. The same equivalent can be used; but it is desirable to make a slight change in the matter of catalyst. The usual catalyst in the oxyalkylation of a material when neither reactant contains chloride, is an alkali such as been pointed out previously. However, if either reactant contains chlorine, another type of reactant can be employed advantageously, to wit, one of the metallic chlorides such as ferric chloride, tin chloride, etc. At times it is substantially necessary to use such a catalyst, for the reason that if an alkali is used, it reacts with a labile chlorine and the catalyst is lost. Our preferred procedure then is to add a slight amount of para-toluene sulfonic acid to the intermediate products so as to neutralize any residual alkalinity. We have then added small amounts of stannic chloride as a catalyst, so as to accelerate the reaction with epichlorohydrin. The amount used is less than one-half of 1%, based on the weight of the material, and usually one or two grams of stannic chloride are sufficient in a reaction involving 300 to 600 grams of reactants. Due to the higher boiling point of epichlorohydrin, as compared with ethylene oxide, for example, one can use identically the same equipment as employed in the manufacture of resins, as described in Example 1a of Patent 2,499,370. In fact, it is our preference to use this particular equipment on a laboratory scale.

Example 1c

The equipment employed was specifically that described in Example 1a of Patent 2,499,370. The resin solution employed was that described as 105b of Patent 2,542,011. Note that in this instance, and in all subsequent examples, just sufficient para-toluene sulfonic acid was added in each case, if required to bring the product to substantially a neutral state, i. e., neutral or very faintly acid to methyl orange indicator. 554 grams of the oxyethylated resin solution were used, and to this there was added 1.6 grams of stannic chloride. The mixture was stirred and heated to 95° C. The above amount represented .8 of a mole per phenolic hydroxyl, based on the original phenol employed. The amount of epichlorohydrin added was just sufficient to react with all the phenolic hydroxyls, to wit, .8 of a mole, or 73.6 grams. The epichlorohydrin was added drop-wise with stirring and all of it was added within a 20-minute period. There was no appreciable rise in temperature, and, in fact, the temperature had dropped to 88° C., after addition of the epichlorohydrin. The reaction was somewhat lighter in color. The reaction mix was then heated with stirring until a temperature of 130° C. was reached. At this point some of the liquid started to reflux at about 125° to 130° C., with a thermometer in the vapor reading 127° C. No reactant passed into the condenser. This indicated that the epichlorohydrin must have reacted completely at the end of this period, for the reason that it boils at 117° C. The yield was 520 grams which contained approximately 25% xylene. In all cases the treatment with epichlorohydrin does not seem to darken the appearance of the initial reactant, and if anything, appears to make the color lighter. It seems to reduce the viscosity perhaps a trifle, at the most, but definitely does reduce water-solubility. Our preference in all instances was to obtain materials, which, after treatment, with epichlorohydrin, showed water-solubility at least equal to that described as desirable in connection with the oxyalkylated resin prior to treatment with epichlorohydrin. Stated another way, such material should meet the emulsification test, using xylene, as previously described.

Example 2c

The same procedure was followed as in Example 1c, preceding, except that the oxyalkylated resin solution employed was that previously described under the leading 117b of Patent 2,542,011. The reactants employed were as follows: 645 grams of the resin solution; 55 grams of epichlorohydrin, and 1.2 grams of stannic chloride. The catalyst and the oxyalkylated resin solution were mixed together, as in Example 1c, and the epichlorohydrin added in a 10-minute period without any temperature rise. The temperature was then raised to 135° to 140° C. As the temperature moved upward, there was a certain amount of refluxing which took place at 127° C. This reflux appeared for only a short period of time, and then the temperature rose rather rapidly to the predetermined point of 135° to 140° C. It was held at this temperature for one hour. At the end of this time, the reaction was complete. The final yield was approximately 700 grams containing about 20% xylene.

Example 3c

The same procedure was followed as in Example 1c, preceding, except that the resin solution employed was that described as 123b of Patent 2,542,011. The amount of this resin solution employed was 779 grams. The amount of catalyst employed was 1.2 grams. The amount of epichlorohydrin employed was 55.2 grams. The resin, plus the catalyst, was heated to about 110° C. and then the epichlorohydrin added in 15 minutes. The temperature remained at 110° to 115° C. for a short period of time and then was raised to 140° C. and stirred for 30 minutes. The yield was about 850 grams, containing about 17% xylene.

The same procedure was followed in a number of similar products and the data for this series is tabulated in the table below.

| Ex. No.[1] | Oxyalk. Resin Sol. | Amount in Grams | Epichlorohydrin Used Grams | SnCl₄ Grams | Max. Reactant Temp. °C. | Reactant Period hours | Yield Grams | Solv. Present Final Prod. Per Cent |
|---|---|---|---|---|---|---|---|---|
| 1c | 105b | 444 | 73.6 | 1.6 | 130 | 1 | 519 | 24.4 |
| 2c | 117b | 645 | 55.0 | 1.2 | 140 | 1 | 702 | 20.0 |
| 3c | 123b | 797 | 55.2 | 1.2 | 140 | ½ | 853 | 16.8 |
| 4c | 128b | 716 | 55.2 | 1.2 | 140 | 1 | 772 | 11.7 |
| 5c | 132b | 1135 | 230 | 2.0 | 140 | 1 | 1367 | 14.7 |
| 6c | 132b | 911 | 153 | 2.0 | 140 | 2½ | 1064 | 12.6 |
| 7c[2] | 132b | 532 | 153 | 2.0 | 130 | 4 | 600 | 15.0 |
| 8c | 132b | 554 | 370 | 2.0 | 130 | 7 | 887 | .6 |
| 9c | 136b | 1025 | 57.8 | 2.0 | 130 | 1 | 1085 | 15.8 |
| 10c[2] | 136b | 521 | 250 | 1.0 | 131 | 4 | 500 | 13 |
| 11c | 163b | 1149 | 129.5 | 3.0 | 135 | 1½ | 1282 | 17.3 |
| 12c[2] | 136b | 820 | 278 | 6.0 | 125 | 12 | 1073 | 12.8 |
| 13c | 140b | 710 | 92.5 | 2.0 | 135 | 1 | 804 | 22.2 |
| 14c | 140b | 710 | 46.2 | 2.0 | 130 | 1 | 758 | 23 |
| 15c[3] | 104a | 528 | 278 | 6.0 | 100 | 1½ | 1164 | 30 |

[1] Ex. No. of Patent 2,542,011.
[2] In these experiments apparently some of the epichlorohydrin was lost through the condenser. The amount which combined is definitely less than the initial amount, in view of the lower final yield.
[3] In this case an unoxyethylated resin was dissolved with enough added xylene to give a solution containing 40% xylene and 60% solvent. The ultimate product was diluted with enough additional xylene so that the final product contained 30% and 70% resin which had been treated with epichlorohydrin.

The chloro-oxypropylated compounds previously described have been prepared in presence of a slight amount of solvent, such as xylene. This xylene usually was residual from the preparation of the ester and carried through the oxyalkylation stage and into the final stage. We have found this purely as a matter of convenience, particularly since solvent may be present for subsequent use, i. e., demulsification, or for the preparation of more complex derivatives. Needless to say, the solvent can be removed. In other words, the solvent, such as xylene, can be distilled out and particularly employing a vacuum of about 20 to 40 mm. of mercury or thereabouts, and a temperature of 130° C.

As previously pointed out, having obtained compounds in which there is a labile chlorine atom present, such as those described above, such products are then used as intermediates for further reaction with tertiary amines, particularly basic tertiary amines, to produce quaternary ammonium compounds. We have employed a large number of tertiary amines. In numerous cases these tertiary amines can be purchased in the open market. In other instances they can be prepared from primary or secondary amines by procedures which convert such amines into tertiary amines, for example, treatment with a methylating agent, such as dimethylsulfate, or an alkylene oxide, such as ethylene oxide, propylene oxide, styrene oxide, etc.

The alkylamines are best prepared from higher fatty acid amines, such as the primary fatty acid amines and secondary fatty amines listed in Armeen Price List No. 10, dated August 30, 1948, issued by Armour & Company, Chicago, Illinois. Rosin amines can be employed and are obtainable from Hercules Powder Company, Wilmington, Delaware. In a general way, the upper carbon atom limit in such amines is approximately 50, as, for example, a dialkyl fatty amine obtained from fatty acids having 22 carbon atoms, which is then treated with dimethylsulfate, styrene oxide, etc., or treated with ethylene oxide or propylene oxide, particularly repetitiously. One example of such amine would be di-octadecylamine, which was subsequently treated with 2 to 4 moles of propylene oxide.

Other suitable amines are the ester type, such as triethanolamine or triethanolamine which has been treated with 3 moles of ethylene oxide, followed by esterification with a higher fatty acid. Similar basic esters are obtainable from tertiary amines, such as diethylethanolamine. For instance, we have employde diethylethanolamine stearate as prepared by Carbide & Carbon Chemicals Corporation, New York city, N. Y., and designated for trade purposes as "Amine ES."

One is not limited to monoamines but polyamines also can be employed. In the treatment of polyamines one can add enough of the chlorine-containing reactant to combine with one or more of the basic nitrogen atoms present. Purely by way of examples, the following reactants are suggested.

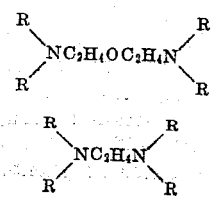

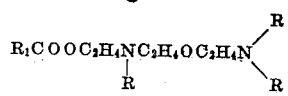

R=alkyl or alkanol.
R₁=alkyl from R₁CO, the acyl radical of a higher fatty acid, or the like.

The following examples and the table illustrate specific preparations:

*Example 1d*

65 grams of the chlorinated derivative identified as Example 1c were mixed with 21.3 grams of dimethyldodecylamine. The temperature rose to 28° C. and then 33° C. The mixture was held at this temperature for 20 minutes and then allowed to stand overnight. It was then heated to 140° C. for 6 hours. At the end of this time the reaction was complete.

*Example 2d*

The same chlorinated derivative was used as in Example 1d. The particular tertiary amine employed was benzyldimethylamine. The amounts employed were 130 grams of the chlorinated derivative identified as 1c, and 27 grams of benzyldimethylamine. The maximum temperature employed was 140° C. and the reaction mass was held at this temperature for a period of 5 hours. The final product was particularly soluble in water.

*Example 3d*

The same procedure was employed as in the preceding examples and the same chlorinated derivative employed. 65 grams of the compound identified as Example 1c were mixed with 32 grams of octylphenoxyethoxyethyl dimethylamine. The material was heated to 100° to 110° C. for approximately 3½ hours. The product obtained was comparatively clear and the reaction appeared to go more rapidly than in Example 1d, preceding.

*Example 4d*

The procedure of the preceding example was employed and also the same chlorinated reactant. 65 grams of the material identified as 1c were mixed with 8 grams of pyridine. The mixture was heated at 110° to 120° C. for approximately 5 hours. The reaction with pyridine takes place rather rapidly, although the products do not seem to be quite as soluble as in some other instances, as hereinafter noted.

*Example 5d*

The same procedure was followed as in Example 4d, preceding, except that the 8 grams of pyridine were replaced by 18.5 grams of tri-N-butylamine. The product was heated at 120° C. for 8 hours. At the end of this time a slight odor of butylamine persisted in the sample, indicating that there was still a very small proportion of unreacted amine present. The above experiments and additional experiments are summarized in the following table.

| Ex. No. | Epichloro.-Deriv. Ex. No. | Amt. Used Grams | Tertiary Amine Used | Amt. Used Grams | Max. Temp. Reaction °C. | Time of Reaction Hours |
|---|---|---|---|---|---|---|
| 1d | 1c | 65 | Dimethyldodecylamine | 21.3 | 140 | 6 |
| 2d | 1c | 130 | Benzyldimethylamine | 27.0 | 140 | 5 |
| 3d | 1c | 65 | Opeedma¹ | 32.0 | 110 | 3½ |
| 4d | 1c | 65 | Pyridine | 8.0 | 120 | 5 |
| 5d | 1c | 65 | Tri-N-butylamine | 18.5 | 120 | 8 |
| 6d | 2c | 146 | Dodecyldimethylamine | 26.6 | 110 | 7 |
| 7d | 2c | 146 | Benzyldimethylamine | 17.0 | 100 | 1 |
| 8d | 2c | 58 | Dimethyl aniline | 6.0 | 120 | 2 |
| 9d | 2c | 58 | Pyridine | 39.0 | 100 | 4 |
| 10d | 2c | 58 | Tri-N-butylamine | 9.3 | 100 | 3½ |
| 11d | 3c | 142 | Dodecyl dimethylamine | 21.3 | 140 | 4½ |
| 12d | 3c | 142 | Benzyldimethylamine | 13.5 | 120 | 3 |
| 13d | 3c | 142 | Alpha picoline | 9.3 | 120 | 2 |
| 14d | 3c | 142 | Opeedma¹ | 32.1 | 100 | 5¾ |
| 15d | 3c | 142 | Diethylcyclohexylamine | 15.5 | 100 | 5¾ |
| 16d | 4c | 129 | 9-Octadecenyldimethylamine | 29.5 | 100 | 8 |
| 17d | 4c | 129 | Pyridine | 7.9 | 135 | 3 |
| 18d | 4c | 129 | Benzyldimethylamine | 13.5 | 150 | 3 |
| 19d | 4c | 129 | Dimethylaniline | 12.1 | 150 | 6 |
| 20d | 4c | 129 | Methyl morpholine | 13.8 | 130 | 1 |
| 21d | 5c | 82 | Pyridine | 2.4 | 130 | ¾ |
| 22d | 5c | 82 | Pyridine | 4.7 | 130 | 1 |
| 23d | 5c | 82 | Pyridine | 11.9 | 130 | 1 |
| 24d | 5c | 82 | Tri-N-butylamine | 27.8 | 120 | 3¾ |
| 25d | 5c | 82 | Dodecyldimethylamine | 32.0 | 155 | 3¼ |
| 26d | 6c | 95.8 | Pyridine | 2.4 | 130 | 1¾ |
| 27d | 6c | 95.8 | Pyridine | 4.74 | 135 | 1 |
| 28d | 6c | 95.8 | Pyridine | 23.7 | 130 | 1¾ |
| 29d | 6c | 95.8 | Opeedma¹ | 38.4 | 110 | 2¾ |
| 30d | 6c | 95.8 | Dimethyl Aniline | 15.5 | 150 | 6½ |
| 31d | 7c | 129 | Pyridine | 7.9 | 130 | 4 |
| 32d | 8c | 108.5 | Pyridine | 4.9 | 145 | 1 |
| 33d | 8c | 108.5 | Benzyldimethylamine | 8.4 | 135 | 1¾ |
| 34d | 8c | 108.5 | Tri-N-butylamine | 11.6 | 120 | 3¼ |
| 35d | 8c | 108.5 | N-methyl Morpholine | 9.8 | 140 | 2 |
| 36d | 8c | 91 | Opeedma¹ | 17.7 | 140 | 5¼ |
| 37d | 9c | 101 | Pyridine | 8.7 | 100 | 1 |
| 38d | 9c | 101 | N-methyl Morpholine | 11.1 | 80 | 1 |
| 39d | 9c | 101 | Tri-N-butylamine | 4.0 | 120 | 8¾ |
| 40d | 9c | 101 | Opeedma¹ | 35.0 | 140 | 1 |
| 41d | 10c | 107 | Pyridine | 7.9 | 130 | 5 |
| 42d | 10c | 107 | Pyridine | 21.0 | 130 | 7 |
| 43d | 10c | 107 | Opeedma¹ | 85.3 | 125 | 4 |
| 44d | 10c | 107 | N-methyl Morpholine | 26.9 | 100 | 2 |
| 45d | 11c | 101 | Opeedma¹ | 40.0 | 130 | 3 |
| 46d | 11c | 101 | Pyridine | 9.9 | 135 | 2 |
| 47d | 11c | 101 | Diethylcyclohexylamine | 19.4 | 140 | 8½ |
| 48d | 11c | 101 | N-methyl Morpholine | 12.6 | 140 | 5 |
| 49d | 11c | 101 | Beta-Picoline | 11.6 | 140 | 3¾ |
| 50d | 12c | 108 | Opeedma¹ | 46.0 | 140 | 5¾ |
| 51d | 13c | 110 | Opeedma¹ | 64 | 130 | 4¾ |
| 52d | 13c | 110 | Amine ES | 76.7 | 140 | 4¾ |
| 53d | 14c | 116 | Opeedma¹ | 96.0 | 135 | 7 |
| 54d | 15c | 118 | N-methyl Morpholine | 20.2 | 120 | 3½ |

¹ Opeedma-Octylphenoxyethoxyethyl Dimethylamine.

In preparing the above amines we have pointed out that there remains a slight amount of solvent which is passed through from the prior reactions, i. e., resin manufacture, oxyalkylation, and chloro-oxypropylation. If desired, such solvent can be eliminated in the customary manner by distillation, and particularly vacuum distillation, under approximately 20 to 40 mm. of mercury at 130° to 140° C. Our experience has been that reaction of a tertiary amine generally gives the product a reddish tint; in other words, the final product is apt to be reddish-black, deep red, or reddish-amber. The viscosity of the final product is apt to be greater than the initial materials from which it is obtained, and it is apt to be a solid, or a sticky or tacky solid. These properties, of course, return to the product in absence of any solvent. We prefer, as a matter of convenience, to have enough solvent present or to add enough, so as to obtain a liquid material which can be handled easily. By and large, we prefer that the original resin be treated with ethylene oxide, rather than propylene oxide, or some other oxide, and we also prefer that at least 5 moles of ethylene oxide be introduced for each original phenolic nucleus. We have found that N-methyl morpholine and octylphenoxyethoxyethyl dimethylamine are particularly desirable reactants. Pyridine and pyridine homologues react rapidly, but our preference, when using these materials, is to have at least 10 moles of ethylene oxide present per initial phenolic hydroxyl. As is noted, the products readily give water-soluble or water-dispersible compounds, for reasons which need not be enumerated, but particularly in light of the co-valency which appears between the quaternary nitrogen compound or radical and the chlorine atom or ion.

Having thus described our invention, what we claim as new and desire to secure by Letters Patent is:

1. A quaternary ammonium compound derived by reaction between (1) a chloro-oxypropylated derivative of hydrophile hydroxylated synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation - susceptible, fusible, organic solvent-soluble, water-insoluble, phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

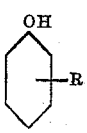

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; said chloro-oxypropylated compounds being obtained by reaction with epichlorohydrin; and (2) a basic tertiary amine having not over 50 carbon atoms.

2. A quaternary ammonium compound derived by reaction between (1) a chloro-oxypropylated derivative of hydrophile hydroxylated synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation - susceptible, fusible, organic solvent-soluble, water-insoluble, phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

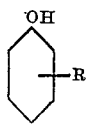

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; said chloro-oxypropylated compounds being obtained by reaction with epichlorohydrin; and (2) a basic teritiary monoamine having not over 50 carbon atoms.

3. A quaternary ammonium compound derived by reaction between (1) a chloro-oxypropylated derivative of hydrophile hydroxylated synthetic products; said hydrophile synthetic products being oxyethylation products of an oxyethylation-susceptible, fusible, organic solvent-soluble, water-insoluble, phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

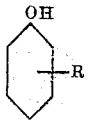

in which R is a hydrocarbon radical having at least 4 and not more than 12 carbon atoms and substituted in one of the positions ortho and para; said oxylakylated resin being characterized by the introduction into the resin molecule at the phenolic hydroxyls of a plurality of divalent radicals having the formula $(C_2H_4O)_n$, and $n$ is a numeral varying from 1 to 20; with the proviso that at least 2 moles of ethylene oxide be introduced for each phenolic nucleus; said chloro-oxypropylated compounds being obtained by reaction with epichlorohydrin; and with the further proviso that the hydrophile properties of the chloro-oxypropylated derivative, as well as the oxyethylated resin, in an equal weight of xylene are sufficient to produce an emulsion when said xylene solution is shaken vigorously with one to three volumes of water; and (2) a basic tertiary monoamine having not over 50 carbon atoms.

4. A quaternary ammonium compound derived by reaction between (1) a chloro-oxypropylated derivative of hydrophide hydroxylated synthetic products; said hydrophile synthetic products being oxyethylation products of an oxyethylation-susceptible, fusible, organic solvent-soluble water-insoluble; phenol-aldehyde resin; said resin being derived by reaction between a difunctional monohydric phenol and formaldehyde; said resin being formed in the substantial absence of phenols of functionality greater than 2; said phenol being of the formula:

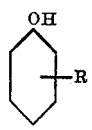

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(C_2H_4O)_n$; and $n$ is a numeral varying from 1 to 20; with the proviso that more than 4 moles of ethylene oxide be introduced for each phenolic nucleus; said chloro-oxypropylated compounds being obtained by reaction with epichlorohydrin on the equimolar basis of one mole of the epoxy compound for each phenolic hydroxyl originally present; and with the further proviso that the hydrophile properties of the chloro-oxypropylated derivative, as well as the oxyethylated resin, in an equal weight of xylene are sufficient to the produce an emulsion when said xylene solution is shaken vigorously with one to three volumes of water; and (2) a basic tertiary monoamine having not over 50 carbon atoms.

5. The product of claim 4, wherein the amine is acyclic.

6. The product of claim 4, wherein the amine is aliphatic and has less than 30 carbon atoms.

7. The product of claim 4, wherein the amine is aliphatic and has less than 30 carbon atoms, and R is substituted in the para position.

8. The product of claim 4, wherein the amine is aliphatic and has less than 30 carbon atoms, and R is a butyl radical substituted in the para position.

9. The product of claim 4, wherein the amine is aliphatic and has less than 30 carbon atoms, and R is an amyl radical substituted in the para position.

10. The product of claim 4, wherein the amine is aliphatic and has less than 30 carbon atoms, and R is an nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
|---|---|---|
| 2,076,624 | De Groote | Apr. 13, 1937 |
| 2,499,365 | De Groote | Mar. 7, 1950 |